May 23, 1950
V. FLICK
2,508,819
GRASS EDGE TRIMMER
Filed May 6, 1946
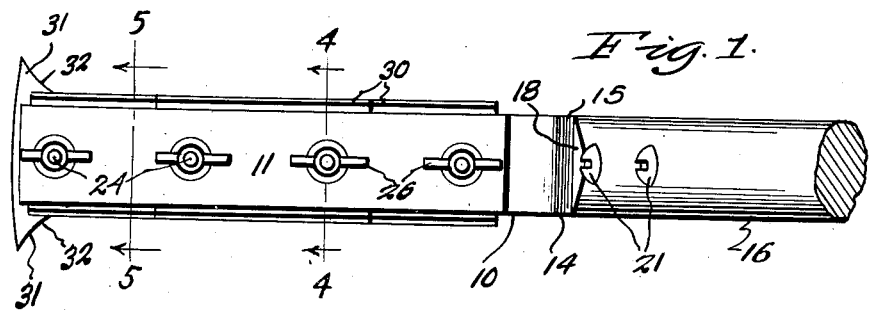
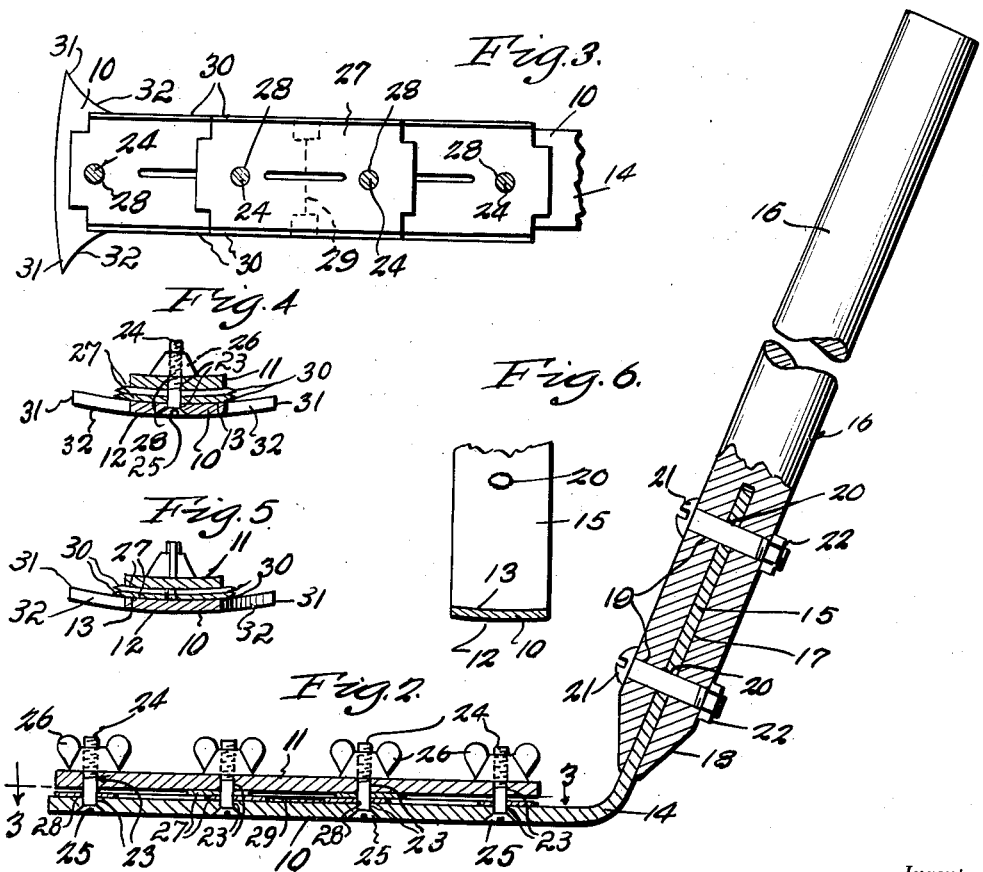
Inventor
VALENTINE FLICK
By Clarence A. O'Brien
and Harvey B. Jackson
Attorneys Patented May 23, 1950

2,508,819

UNITED STATES PATENT OFFICE 2,508,819

GRASS EDGE TRIMMER

Valentine Flick, Cincinnati, Ohio

Application May 6, 1946, Serial No. 667,589

2 Claims. (Cl. 30—299)

This invention relates to a grass edge trimmer for trimming grass from close places, such as walks, shrubbery, building foundations, trees, fences, and flower beds without kneeling, stooping, crawling, or sitting on the ground.

The object of the invention is to provide a garden tool or grass edge trimmer which operates on the order of a sickle but is provided with a long handle substantially 36" long which permits the device to be operated with a pendulum or golf-club-like swing while in a standing position, to easily trim the grass from close places such as above specified, and which permits the use of discarded, double-edged razor blades, or the like, thereby eliminating the use of rotary blades or other expensive materials and obviating the necessity of the operator stooping, kneeling, crawling, or sitting on the ground in trimming places which cannot be reached with a lawn mower, as well as eliminating the use of shears, sickles, or other long-bladed cutting implements.

Another object of the invention is to provide a tool of the character described having a relatively long handle and a head having a clamp or means for holding a plurality of perforated razor blades which have been discarded, especially of the double-edge type, or with two opposite cutting edges, so as to retain the same in position by using the usual holes therein, designed for fastening the blades in a razor, and in such a manner that both edges of the blades, preferably three in number being employed, are exposed, in addition to eliminating all expensive complicated springs and parts for holding the blades in place, thereby reducing the danger of injuring the person who assembles it and permitting, by reason of the simplicity of its construction, reduction of the cost of the grass edge trimmer to a minimum.

Other objects and advantages reside in the details of construction and operation as more fully hereinafter described and claimed, reference being had to the accompanying drawings forming part hereof, wherein like reference numerals refer to like parts throughout, and in which:

Figure 1 is a top plan view of a grass edge trimmer constructed in accordance with the invention, Figure 2 is a sectional side elevation thereof, Figure 3 is a fragmentary plan view taken on the plane of the section line 3—3 of Figure 2, and showing the bottom blade holding member or jaw, Figure 4 is a sectional view taken on the line 4—4 of Figure 1, Figure 5 is a sectional view taken on the line 5—5 of Figure 1, Figure 6 is a fragmentary detailed sectional view showing the curvature of one of the blade-securing members or jaws, and Figure 7 is a fragmentary elevational view of the lower jaw illustrating the tapered flanged guides at opposite side edges thereof.

Referring to the drawings in detail, in which like reference characters designate corresponding parts throughout the several views, the grass edge trimmer is shown as comprising an elongated lower member or jaw 10 and an upper member or jaw 11, both formed of a strip of metal of corresponding width and thickness and of concavo-convex cross section, as shown in the sectional views of Figures 4, 5, and 6, with the bottom surface convexed, as indicated at 12, and the top surface concaved, as indicated at 13. The member 10 is longer than the member 11, and is bent angularly, as at 14, at an obtuse angle to the bottom portion of the member 10 at an angle slightly greater than a right angle, to form an attaching shank 15, for securing the same to a handle 16, which is preferably a long golf-club-like handle approximately 36 inches long, or whatever corresponding length may be required according to the height of the person who uses the implement. The shank 15 is shown fitted in a slot or kerf 17 in the lower end of the handle, which may be tapered, as indicated at 18, at its extreme lower end, and provided with a pair of apertures 19 aligning with corresponding apertures 20 in the shank 15, to receive clamping and holding bolts 21. Two of such bolts 21 are preferably employed, to rigidly secure the member 10 at its shank portion 15 in alignment with the handle 16, and held by the clamping nuts 22 mounted on the threaded ends of the bolts as shown.

As previously stated, the curvature of the members 10 and 11 is adapted to cause said members to fit one over the other in conforming relation and each is provided with four equidistantly spaced apertures or holes 23, or other suitable number desired, which are disposed in alignment or registry, when the plate or clamp jaw 11 is fitted over the plate or clamp jaw 10, to receive bolts 24, which have their heads 25 preferably countersunk in the bottom face of the jaw member 10 and are designed to be held by butterfly or wing nuts 26 mounted on the threaded upper ends of the bolts against the upper face of the jaw member 11. The purpose of this is to hold a plurality of razor blades 27 of the two or double-edge type in position to form the cutting edges, said blades being usually discarded razor blades. Ordinarily, the blades are provided with openings or apertures 28 near the ends thereof designed to receive the fastening means for securing the blades in position in a razor, and the apertures or holes of the respective blades are all equidistantly spaced apart the same distance as the distance between the bolts 24. Thus, one of the blades is engaged on a pair of the bolts 24 at the free ends of the jaws 10 and 11 and another blade engaged on the other pair of bolts at the inner ends of said jaws adjacent to the handle, so as to abut at their inner edges, as indicated at 29. Another blade 27 is then placed over the innermost two bolts 24 so as to overlie or overlap the inner halves of the aforesaid two blades, and form a continuous cutting edge at each side of the bars or clamp constituting the blade-holding means, and so that the cutting edges 30 thereof will project slightly beyond the longitudinal or side edges of the clamping members or jaws 10 and 11. When the blades are so applied to the jaw member 10, the jaw member 11 is placed over the bolts and then the nuts 26 applied thereto so as to clamp the blades in position. The arcuate or curved formation of the jaw members 10 and 11 will cause slight flexing or bending of the blades in arcuate form so as to project the cutting edges thereof slightly upwardly at the proper angle, with the cutting edges on both sides, and so that the blades will tend to move upwardly away from the ground in an arc substantially conforming to the arc of swing of the handle when the impement is in use, employing a pendulum or golf-club-like swing while the operator is in a standing position. In order to assist in guiding the grass to be cut against the blades at points close to a wall or other object, the outer end of the jaw member 10 is preferably provided with tapered flanges or extensions 31 at opposite side edges and corners thereof, with concaved inner edges 32 forming hooks facilitating said guiding action to hook or pull the grass into and against the cutting edges, and with the outer edges conforming to the free end edge of the member 10 forming a convex end.

Thus, a person in a standing position can operate the device as described, with a cutting action in either direction of swing by reason of the continuous cutting edge on both sides, and by having the clamp narrower than the razor blades, so as to expose enough of the edges of the blades on either side of the clamp to permit the instrument to have an exposed cutting edge on both sides. Thus, while the clamp or head may be made relatively short, as described, it may be used to employ any number of a plurality of blades, although three are shown. The device eliminates all expensive and complicated springs employed for holding the blades, and thereby reduces the danger of injury to the person who assembles it. With the long handle as described, and the device with the keen-cutting edges as described on both sides, the operator can cut grass close to building foundations, trees, fences, walks, and flower beds without kneeling, stooping, crawling, or sitting on the ground. The double-edge grass trimmer also eliminates the necessity of using shears, sickles, or other long-bladed implements when trimming grass edges, and the simplicity of construction reduces the cost of the grass edge trimmer to a minimum thereby placing the same within the reach of all.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what I claim is:

1. A grass edge trimmer comprising a handle, a clamp comprising a pair of jaw members of elongated bar form, one of said jaw members having a flatwise angularly bent shank portion, means for securing said shank portion to the handle at its lower end with the handle extending upwardly therefrom, said handle being of a length whereby the same may be swung with a golf-like swing while in a standing position, a second jaw member fitting over the first jaw member, and both members being of concavo-convex cross section, fastening bolts fitted through openings in said jaw members in equidistantly spaced relation, double-edged safety razor blades having end openings for engagement by said bolts so that the blades will project outwardly and upwardly from the edges of said jaw members when flexed between the jaw members upon clamping the same together, and nuts engaged on said bolts to clamp said jaw members together against the blades, the lower jaw member having the outer end thereof provided with tapered flanges at opposite sides curved inwardly to guide grass close to objects toward the cutting edges.

2. A grass edge trimmer comprising a handle, a clamp comprising a pair of jaw members of elongated bar form, one of said jaw members having an angularly bent shank portion extending upwardly therefrom, means for securing said shank portion to the handle at its lower end, said handle being of such length whereby the same may be swung with a golf-like swing while in a standing position, a second jaw member fitting over the first jaw member, and both members being of concavo-convex cross section, fastening bolts fitted through openings in said jaw members in equidistantly spaced relation, double-edged safety razor blades having openings near the ends thereof to fit over the bolts so that the blades will project outwardly and upwardly from the edges of said jaw members when flexed between the jaw members upon clamping the same together, and nuts engaged on said bolts to clamp said jaw members together against the blades, the lower jaw member having the outer end thereof provided with tapered flanges extending toward the opposite edges thereof to guide grass close to objects toward the cutting edges, said flanges having concaved inner guiding edges extending to and merging with the edges of the lower jaw member.

VALENTINE FLICK.

REFERENCES CITED

The following references are of record in the file of this patent:

UNITED STATES PATENTS

| Number | Name | Date |
| --- | --- | --- |
| 780,453 | Struebe | Jan. 17, 1905 |
| 1,992,517 | Watson | Feb. 26, 1935 |
| 2,070,190 | Wells | Feb. 9, 1937 |
| 2,283,322 | Edell | May 19, 1942 |
| 2,313,818 | Gaisman | Mar. 16, 1943 |
| 2,400,284 | Brooke | May 14, 1946 |